Jan. 20, 1970     G. J. BUCK ET AL     3,490,137

ELBOW FORMING METHODS AND MACHINES

Filed Sept. 11, 1967     8 Sheets-Sheet 2

GEORGE J. BUCK
LOUIS E. MARANTETTE
INVENTORS.

BY

BUCKHORN, BLORE, KLARQUIST & SPARKMAN
ATTORNEYS

Jan. 20, 1970

G. J. BUCK ET AL 3,490,137

ELBOW FORMING METHODS AND MACHINES

Filed Sept. 11, 1967

GEORGE J. BUCK
LOUIS E. MARANTETTE
INVENTORS.

BY

BUCKHORN, BLORE, KLARQUIST & SPARKMAN
ATTORNEYS

Jan. 20, 1970  G. J. BUCK ET AL  3,490,137
ELBOW FORMING METHODS AND MACHINES
Filed Sept. 11, 1967  8 Sheets-Sheet 5

GEORGE J. BUCK
LOUIS E. MARANTETTE
INVENTORS.

BY
BUCKHORN, BLORE, KLARQUIST & SPARKMAN
ATTORNEYS

Jan. 20, 1970   G. J. BUCK ET AL   3,490,137
ELBOW FORMING METHODS AND MACHINES
Filed Sept. 11, 1967   8 Sheets-Sheet 6

GEORGE J. BUCK
LOUIS E. MARANTETTE
INVENTORS.
BY
BUCKHORN, BLORE, KLARQUIST. & SPARKMAN
ATTORNEYS

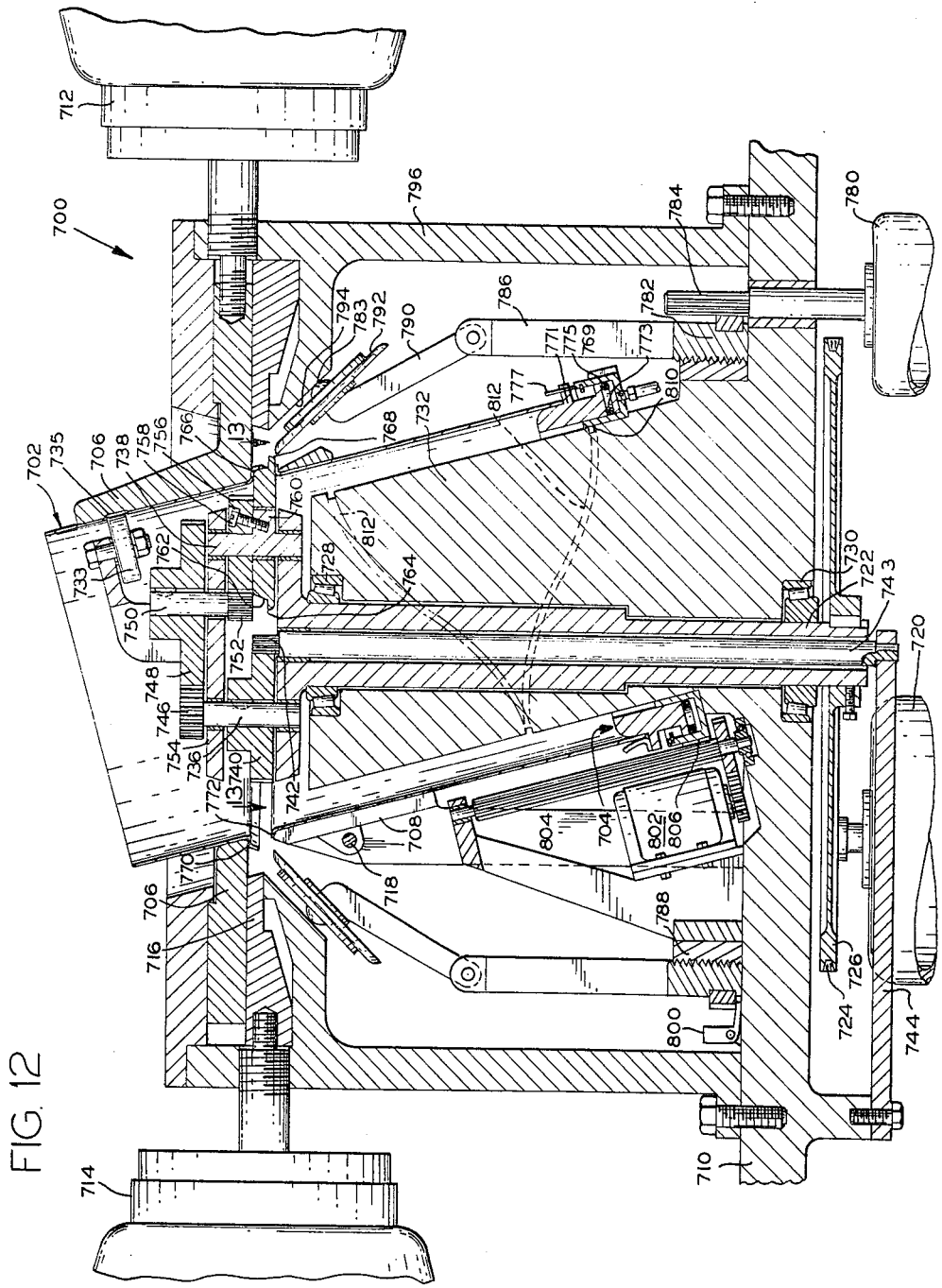

GEORGE J. BUCK
LOUIS E. MARANTETTE
INVENTORS.

BY
BUCKHORN, BLORE, KLARQUIST & SPARKMAN
ATTORNEYS

United States Patent Office 3,490,137
Patented Jan. 20, 1970

3,490,137
ELBOW FORMING METHODS AND MACHINES
George J. Buck, Minneapolis, Minn., and Louis E. Marantette, Portland, Oreg., assignors to General Metalcraft, Incorporated, Portland, Oreg., a corporation of Washington
Filed Sept. 11, 1967, Ser. No. 666,637
Int. Cl. B21d 39/04
U.S. Cl. 29—437
25 Claims

ABSTRACT OF THE DISCLOSURE

An adjustable elbow is formed by an apparatus including segmental clamps which grip the exterior of a cylindrical blank in a horizontal plane inclined to the longitudinal axis of the blank. The blank is held by an inclined holder. An internal shearing disc in a horizontal, parallel plane and inside the blank is rotated and is shifted radially and circumferentially by an eccentric mechanism driven by gearing. The shearing disc severs the blank with segmental external shear plates, and internal and external formers roll the lower end portion of the upper section of the blank into a cupped rim and the upper end portion of the lower section of the blank into an external flange. The lower section then is pushed upwardly by the holder into the cupped rim of the upper section, and an outer roller is revolved by a ring gear around the cupped rim and is cammed inwardly against the rim to roll the rim over the external flange of the lower section to complete the joint. The blank then is released by the clamps and the holder is shifted upwardly by a multiple cylinder and is rotated 180° by a rack and pinion drive to position the blank to form a second joint below the joint just formed. The second joint is formed like the first joint, and the multiple cylinder again moves the holder upwardly and rotates the blank 180° to form a third joint. A keying rib is formed on the blank to hold it against rotation about a transverse axis after each severing operation. The cupped intermediate flange is moved in by a transverse former in the embodiment of FIGS. 1 to 12 and by a cupped former in the embodiment of FIG. 14.

DESCRIPTION

This invention relates to elbow forming methods and machines, and more particularly to methods and machines for automatically forming multiple joint elbows.

An object of the invention is to provide an improved elbow forming method and machines.

Another object of the invention is to provide methods and machines for automatically forming multiple joint elbows.

A further object of the invention is to provide single work station automatic elbow forming machines.

Another object of the invention is to provide methods of forming elbows from cylinders holding the blank while severing the blank into two parts, forming a cupped flange on one part and a radial flange on the second part, moving the radial flange into the cupped flange and forming the cupped flange over the radial flange to form a joint, then moving the blank longitudinally and then holding the blank and similarly forming a second joint.

Another object of the invention is to provide elbow forming machines which sequentially form inclined first joints in cylinders, move the cylinders axially and turn the cylinders 180°, and form second joints.

Another object of the invention is to provide an elbow forming machine in which an inner forming wheel forms a cupped flange in a cylinder in a plane inclined to the cylinder and in the center of which intersect the centerline of the cyinder and the center of rotation of the forming wheel.

Another object of the invention is to provide an automatic elbow forming machine in which a planetary roller is rolled around a cupped flange to turn in the flange.

Another object of the invention is to provide an automatic elbow forming machine adapted at a single station to sever a cylinder and form and assemble two sections of the cylinder.

A further object of the invention is to provide methods and machines for forming elbows by first severing a cylinder into two sections, then forming a cupped flange on one section and a radial flange on the other section, and then forming the rim of the cupped flange over the radial flange.

Another object of the invention is to provide simple, inexpensive elbow forming methods and machines.

Another object of the invention is to provide very compact machines for forming multiple joint elbows.

The invention provides elbow forming methods and machines in which a sheet metal cylinder is first severed along a plane inclined to the longitudinal axis of the cylinder, then the adjacent end portions of the severed sections of the cylinder are formed into a cupped flange on one section and a radial flange on the other section, the sections are pushed together to seat the radial flange in the cupped flange and the rim of the cupped flange is deformed inwardly to trap the radial flange. In a machine forming one specific embodiment of the invention, a sheet metal cylinder is inserted into a holder, external clamps are brought into gripping engagement with the cylinder, an eccentric forming and shearing disc is rotated and shears the cylinder with external shearing plates, the external shearing plates are withdrawn, the forming and shearing disc is rotated in a larger orbit to form the cupped flange and the radial flange, the radial flange is moved into the cupped flange, an external planetary roller is rolled around the rim of the cupped flange to turn it in over the radial flange to complete one rotary joint, after which the holder is rotated 180° and moves the cylinder axially to present another portion of the cylinder to the clamps, the forming and shearing disc and shearing plates, and another rotary joint is formed. In a machine forming another embodiment of the invention, the cupped flange is turned in by rollers which are revolved around the flange and moved longitudinally of the cylinder and are cammed inwardly, and a holder is moved longitudinally by a spiral track as the holder is turned to move a second portion of a cylinder to forming elements as a joint subsequent to the first formed joint is to be formed. In a machine forming another embodiment of the invention, an annular, cupped forming member is moved axially of the sheet metal cylinder to engage and roll or turn inwardly a rim of a cupped flange on a section of the cylinder to entrap a radial flange of a second section of the cylinder to complete a rotary joint.

A complete understanding of the invention may be obtained from the following detailed description of elbow forming methods and machines forming speicfic embodiments thereof, when read in conjunction with the appended drawings, in which.

Figure 1:
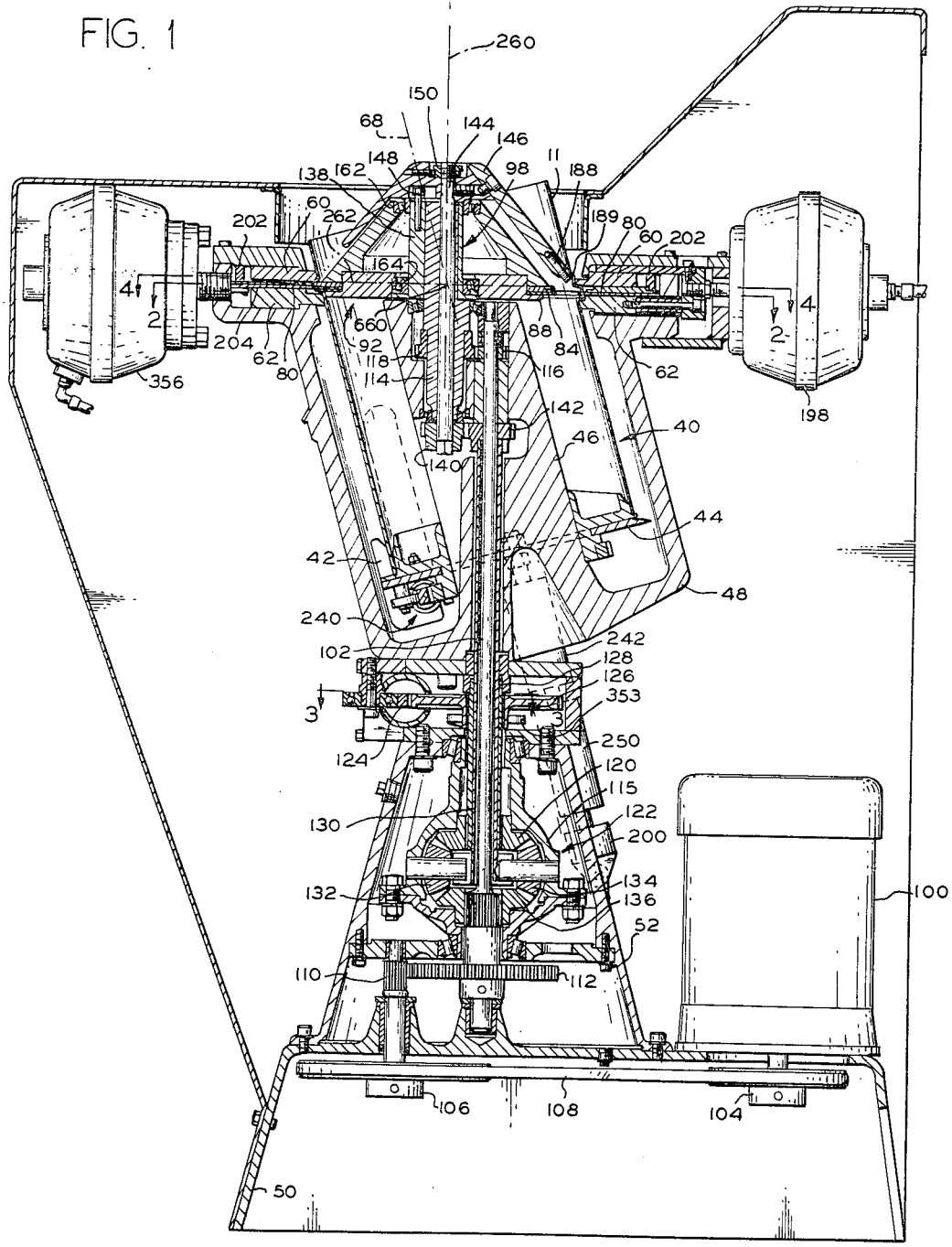
FIG. 1 is a vertical sectional view of an elbow forming machine forming one embodiment of the invention.
Figure 2:
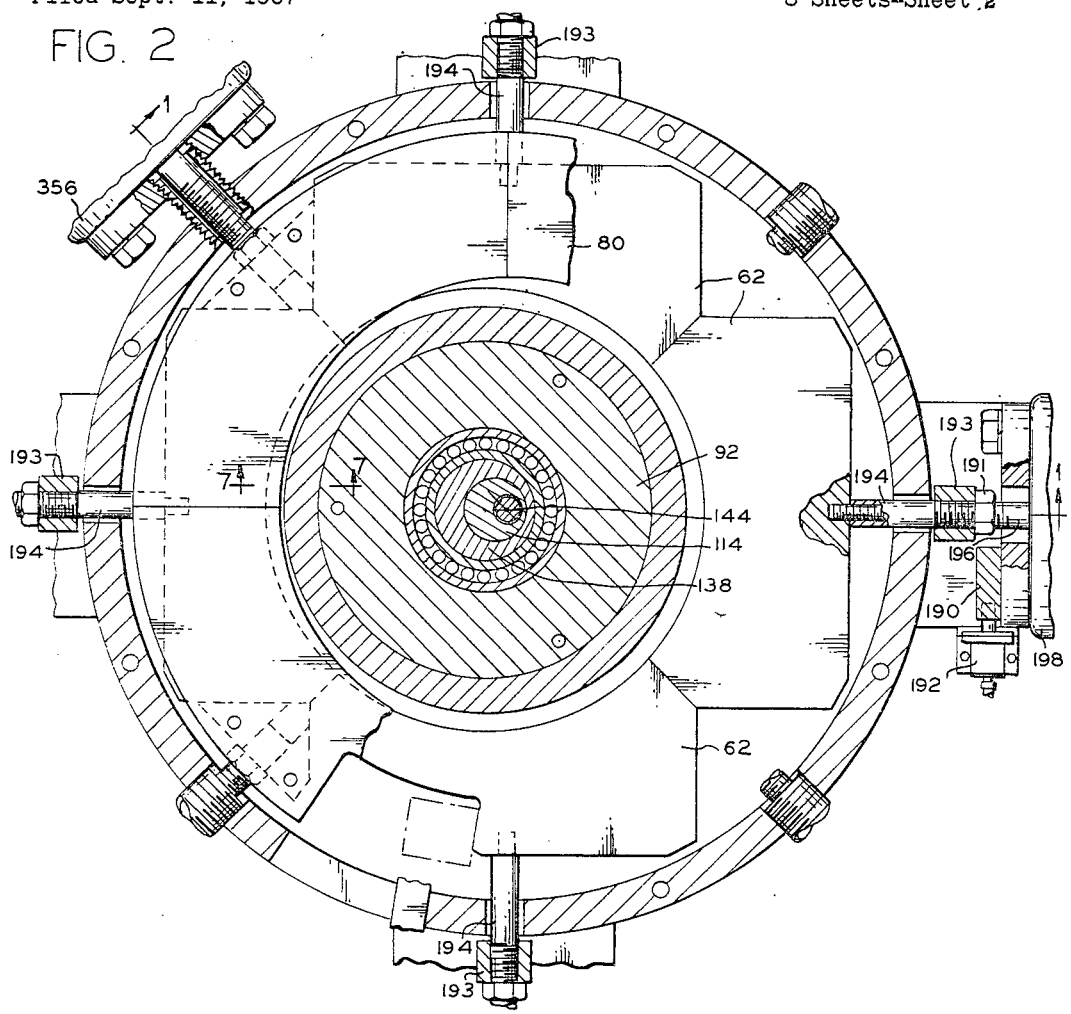
FIG. 2 is an enlarged horizontal sectional view taken along line 2—2 of FIG. 1.
Figure 3:
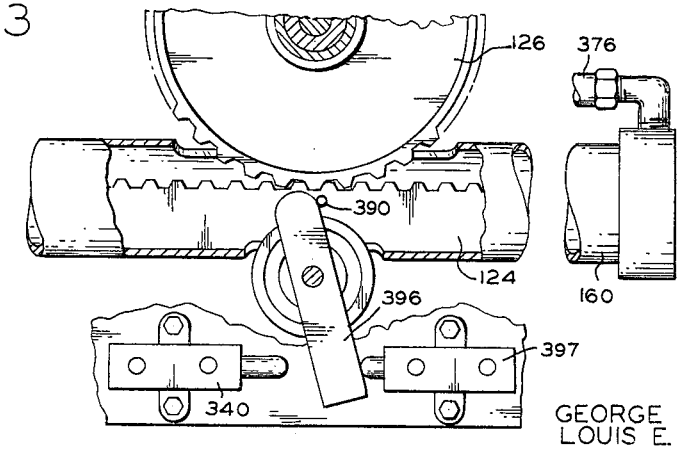
FIG. 3 is an enlarged horizontal sectional view taken along line 3—3 of FIG. 1.
Figure 4:
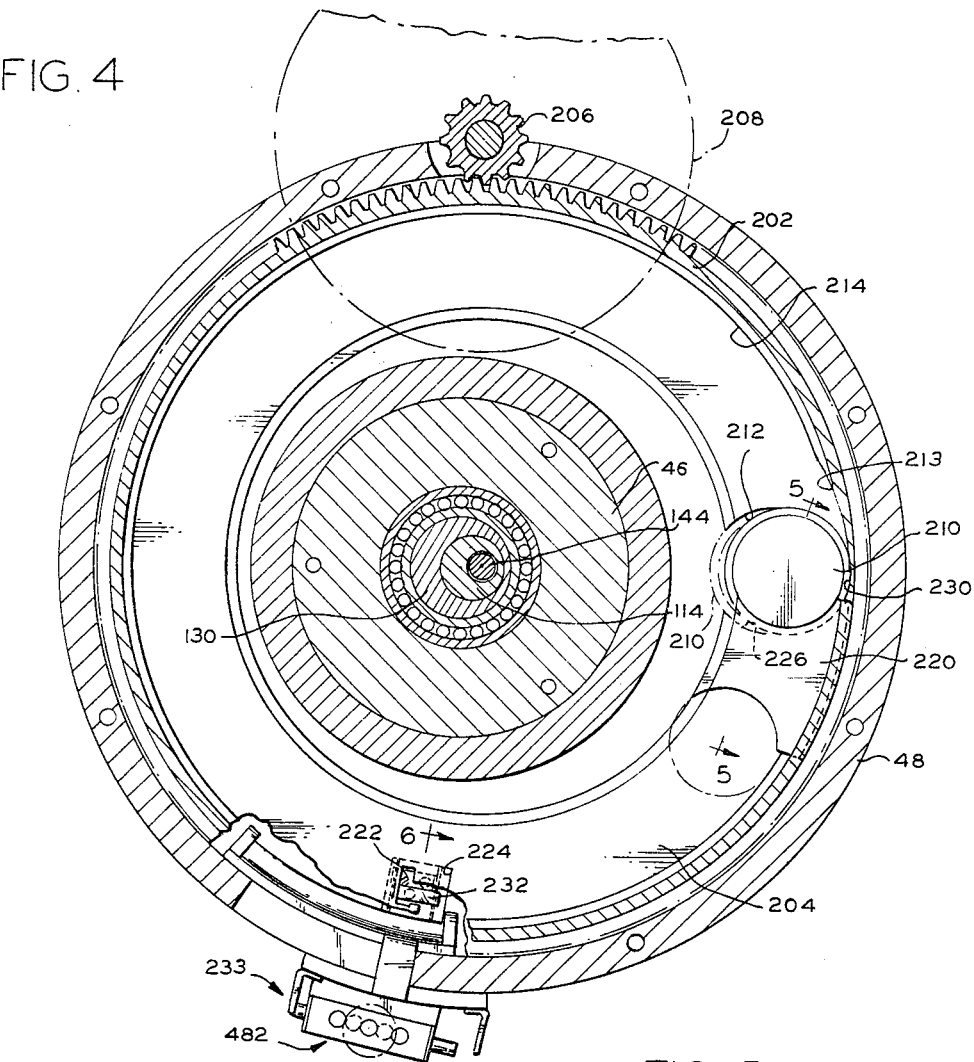
FIG. 4 is an enlarged horizontal sectional view taken along line 4—4 of FIG. 1.
Figure 5:
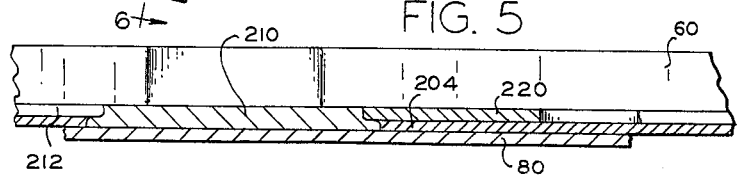
Figure 6:
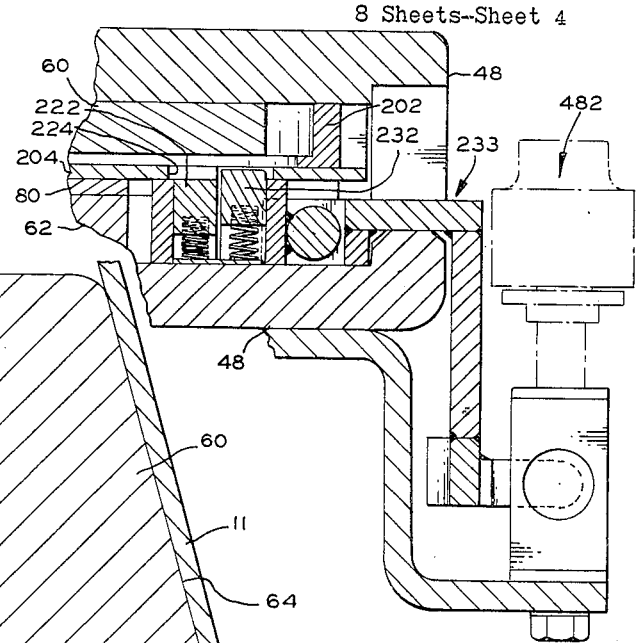
Figure 7:
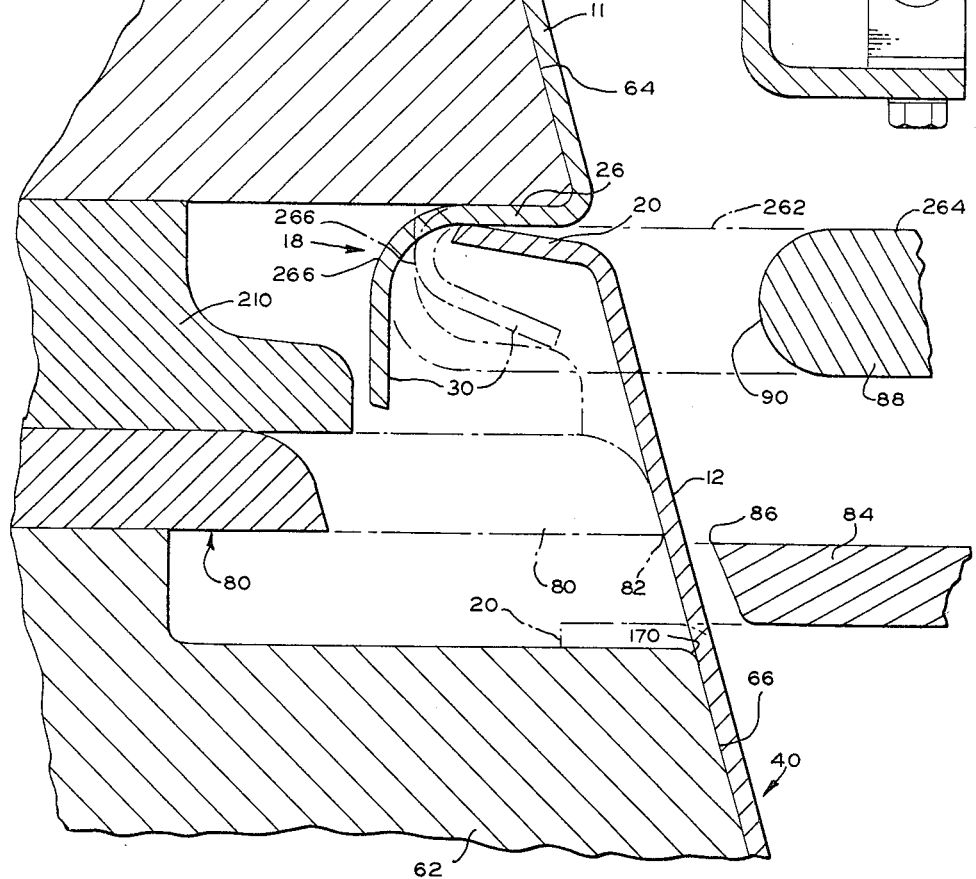
Figure 8:
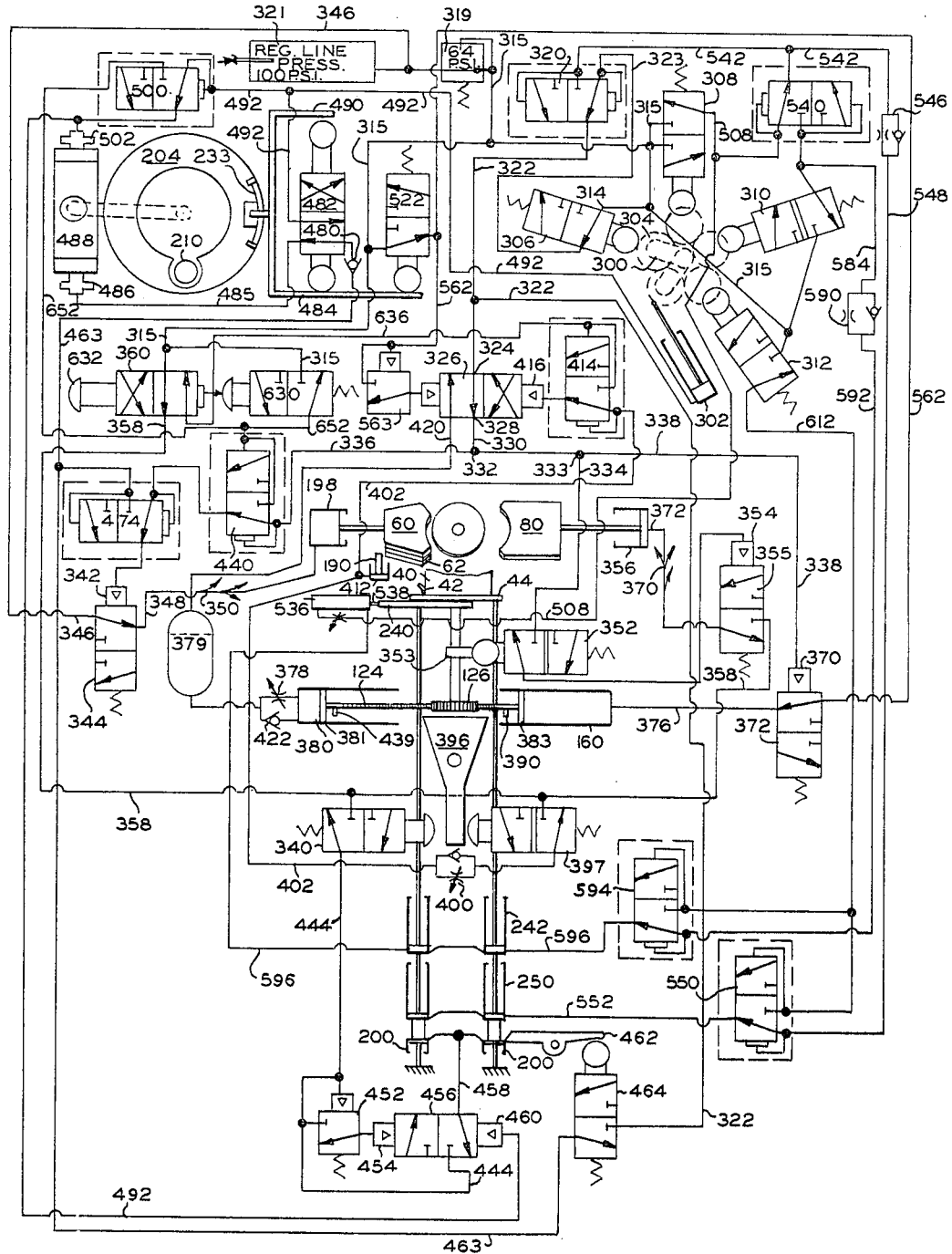
Figure 9:
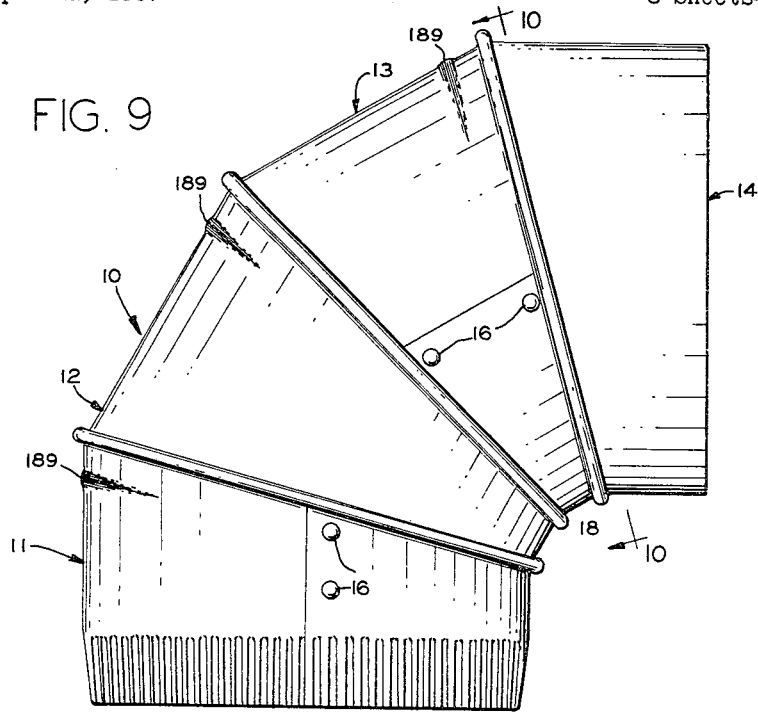
Figure 10:
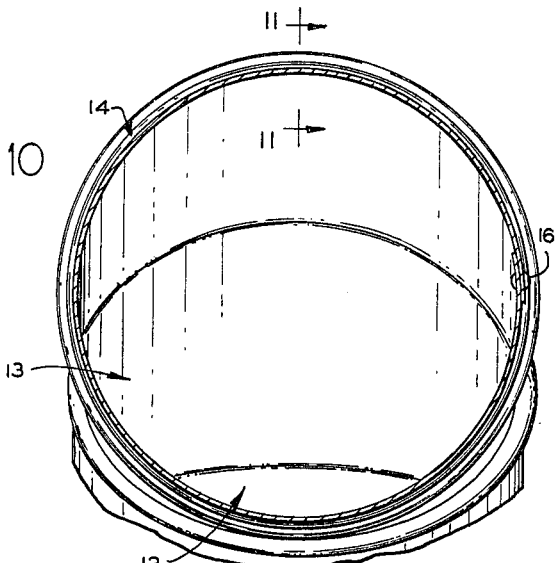
Figure 11:
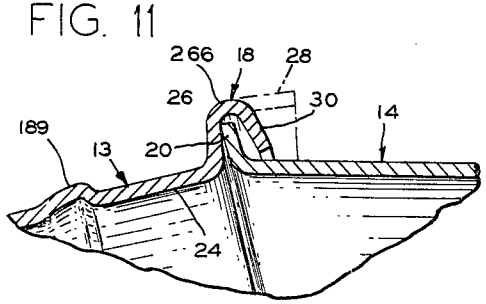
Figure 14:
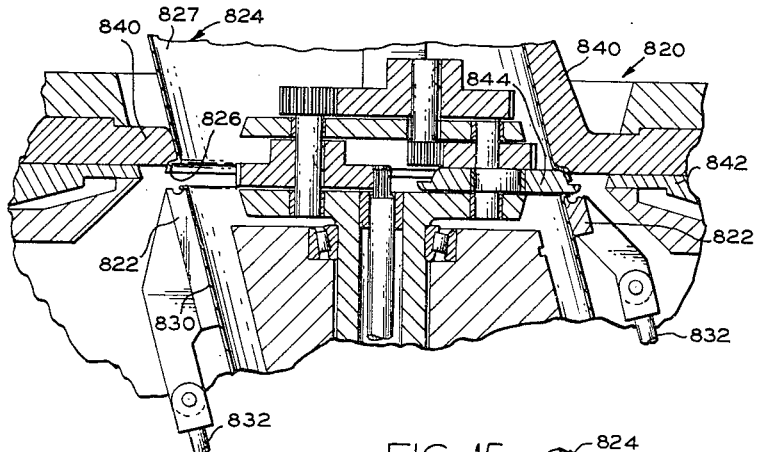
Figure 15:
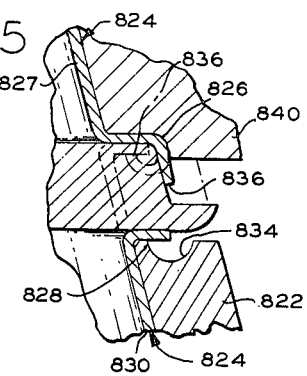
Figure 13:
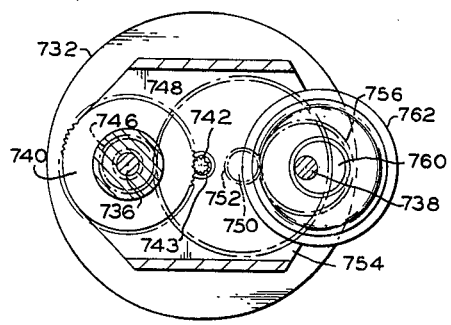

FIGS. 5 and 6 are enlarged vertical sectional views taken respectively along lines 5—5 and 6—6 of FIG. 4;

FIG. 7 is an enlarged vertical sectional view taken along line 7—7 of FIG. 2;

FIG. 8 is a schematic view of the elbow forming machine of FIG. 1;

FIG. 9 is an enlarged side elevation view of an elbow formed by the elbow forming machine of FIG. 1 and in accordance with a method forming one embodiment of the invention;

FIG. 10 is an enlarged vertical sectional view taken along line 10—10 of FIG. 9;

FIG. 11 is an enlarged vertical sectional view taken along line 11—11 of FIG. 10;

FIG. 12 is a vertical sectional view of an elbow forming machine forming an alternate embodiment of the invention;

FIG. 13 is a horizontal sectional view taken along line 13—13 of FIG. 12;

FIG. 14 is a vertical sectional view of an elbow forming machine forming an alternate embodiment of the invention; and FIG. 15 is an enlarged vertical sectional view of the elbow forming machine of FIG. 14.

Referring now in detail to the drawings, there is shown in FIGS. 1 to 8 a machine forming one embodiment of the invention for forming a sheet metal elbow 10 (FIGS. 9, 10 and 11) for furnace and stove piping and having sections 11, 12, 13 and 14 in accordance with a method embodying the invention. The elbow has three slip joints 18 which are substantially perfectly circular to provide free rotation of each section relative to its adjacent section. That is, each joint 18, while each section is cut at a 15¼° angle relative to the longitudinal axis, instead of being elliptical is formed into a perfect circle with external radial flange 20 and flange 26 and lip 30 being formed into substantially perfect circles so that the joint 18 is circular rather than elliptical.

The apparatus forms the elbow 10 (FIG. 1) automatically from a sheet metal cylinder 40 which is placed in a notched, frictional gripper 42 of an annular holder 44 slidable and rotatable on a fixed arbor 46 of a fixed frame 48 carried by base 50 and frame section 52. Multiple segmental upper jaws 60 (FIGS. 1, 2 and 7) and multiple segmental lower jaws 62 carried therewith are moved into gripping engagement with the exterior portions of the cylinder 40. Arcuate gripping faces 64 and 66 of the jaws 60 and 62 (FIG. 7), respectively, form substantially perfect cylinders or circles when the jaws are closed. The jaws 60 and 62 lie in parallel planes inclined to longitudinal axis 68 of the arbor 46 and cylinder 40 at an angle of about 15¼°, and engage short portions of the cylinder 40 which would normally be ellipses. However, the jaws closely engage the cylinder completely around the cylinder and distort the engaged portions of the cylinder into substantially perfect circles or cylinders.

Segmental shear plates 80 slidable between the upper and lower jaws 60 and 62 are moved radially inwardly so that arcuate cutting edges 82 (FIG. 7) engage the cylinder 40 completely around the circumference of the cylinder in a plane parallel to those of the jaws 60 and 62. A circular shearing disc 84 having a circular shearing edge 86 and a circular forming disc 88 having a rounded peripheral edge 90 are carried by a wheel housing 92 (FIG. 1) in planes parallel to those of the jaws 60 and 62 and the shear plates 80.

The wheel housing 92 is revolved by a shiftable eccentric rotor 98 rotated by an electric motor drive 100 driving a shaft 102 through pulleys 104 and 106, a belt 108, and gears 110 and 112. The shaft 102 rotates an inner eccentric sleeve 114 through gears 116 and 118 having a 1:2 ratio. When a bevel gear 120 of a differential 122 is held in a stationary position by a rack 124, a gear 126 and a tubular shaft 128, a tubular shaft 130 is rotated at one-half the speed of the shaft 102 through pinions 132 and 134 meshing with the gear 120 and a gear 136 keyed to the shaft 102. The shaft 130 drives an outer eccentric sleeve 138 through gears 140 and 142 having a 1:1 ratio, a shaft 144, a cap 146 and a pin 148 extending into a radial slot 150 and carried by the sleeve 138.

When the gear 120 is stationary, the eccentric sleeves 114 and 138 and the shaft 144 are all rotated at the same speed and in the same direction. When the rack 124 is held by a cylinder drive 160 (FIG. 3) at one end of its travel, the sleeves 114 and 138 are in the positions shown in FIG. 2 in which the eccentricities add. When the cylinder drive 160 is at the other extreme of its travel, which is its starting position, the phase relationship of the eccentric sleeves 114 and 138 has been shifted 180° and the eccentrics are 180° out of phase so that zero throw is imparted to the wheel housing 92, which is mounted by bearings 162 and 164 (FIG. 1) on the sleeve 138. As the cylinder drive is actuated and moves gradually from its starting position, the phase of the eccentric sleeves is gradually shifted from zero throw of the wheel housing 92 to maximum throw and the shearing disc 84 and the forming disc 88 are revolved. The shearing disc and forming disc are revolved in gradually increasing throws from positions initially slightly out of contact with the cylinder 40 first to positions in which the shearing disc engages and rolls around the cylinder 40 to shear the cylinder 40, the shearing disc then starts to spin or roll out the flange 20 over rounded corners 170 (FIG. 7) of the plates 62, and the forming disc 88 engages and starts to roll out the flange 26 and the flange 30 into a cup-shaped configuration as shown in full lines in FIG. 7. The outer shear plates 80 are withdrawn shortly after the start of the rolling of the flanges 26 and 30 and the forming disc 88 continues to move out as it is revolved to form the flanges 26 and 30 into the cup. A roller 188 (FIG. 1) carried by the cap 146 eccentrically of the adjacent portion of the cylinder 40 rolls a short locking rib 189 over the adjacent jaw 60. The rib 189 prevents clockwise movement, as viewed in FIG. 1, of the section 11 after severing and during forming of the flanges 20, 26 and 30.

After the flanges 20, 26 and 30 (FIG. 7) have been formed after severing apart the sections 11 and 12, the cylinder drive 160 (FIG. 3) is reversed to bring the phase of the eccentric sleeves 114 and 138 (FIGS. 1 and 4) back to zero throw relationship, which retracts the discs 84 and 88 completely inside the cylinder 40. Wedges 190 (FIG. 2) are slid by cylinders 192 over adjustable stop nuts 191 on spacer sleeves 194 on actuator rods 196 of pneumatic bellows type actuators 198, the rods being connected to the jaws 60 and 62, and behind connecting blocks 193 connecting the paws 60 and 62. The actuators 198 then are spring actuated after having air pressure relieved to tend to move the paws 60 and 62 radially outwardly toward retracted positions. However, after the jaws have been retracted just far enough to release their radial grips on the sections 11 and 12, the wedges 190 are engaged by the connecting blocks 193 to prevent further retraction of the jaws.

A pair of short cylinders 200 (FIG. 1) supporting the holder 44 than are actuated to move the holder 44 with the lower portion of the cylinder 40 upwardly along the arbor 46 to seat the flange 20 against the flange 26, as shown in full lines in FIG. 7. The actuators 198 then are operated to move the jaws 60 and 62 back into clamping engagement with the sections 11 and 12 of the cylinder 40.

A ring gear 202 (FIG. 4) for driving a thin carrier ring 204 is then rotated by a pinion 206 driven by a reversible electric motor 208 to move the ring 204 slightly over one revolution. The plate 204 is positioned between the clamps 60 and the shear plates 80 and carries a turndown wheel or forming disc 210 in a pocket 212. As the motor 208 starts to rotate the ring gear 202 in a clockwise direction, as viewed in FIG. 4, a camming or wedging portion 213 of the otherwise cylindrical periphery 214 of the ring gear 202 pushes the wheel 210 radially inwardly against the flange 30 (FIG. 7) and rolls the adjacent portion of the flange 30 to the broken line position of the flange 30, the wheel 210 initially rolling along the flange 30 and the short wedging portion 213 to roll the flange 30 inwardly gradually until the wedging portion 213 rolls on past the wheel 210 and the periphery 214 engages the wheel, rolls the wheel around the flange 30 and keeps the wheel in its extreme radially inward forming position. The ring gear rotates slightly over two revolutions to revolve the rolling wheel slightly over one revolution to fully roll down or inwardly the flange 30 completely around the periphery of the flange. As the wheel is so revolved, it rotates the ring 204. A projecting pusher 220 carried by the ring gear engages and pushes the wheel 210 along if the latter should for any reason become jammed.

After the ring 204 is rotated about one revolution, a pawl 222 on a lost motion actuator carriage 223 enters a notch 224 in the ring 204 and moves the carriage with the ring 204 until the carriage actuates controls 482 reversing the drive of the motor 208. The ring gear 220 then is driven counterclockwise, as viewed in FIG. 4, and moves the wheel 210 and ring 204 slightly over 360° back to their starting positions, at which time arcuate edge 226 of the ear 220 pushes the wheel 210 back into recess 230 in the ring gear. Just before the wheel and ring reach their starting positions, a pawl 232 on the carriage 233 enters the notch 224 and the carriage 233 is moved back to its starting position in which it actuates the controls 482 to stop the motor 208.

While the ring gear 220 is moved counterclockwise, the holder 44 (FIG. 1) with the cylinder 40 is rotated 180° by a rack and pinion drive 240, the short cylinders 200 are contracted, and cylinders 250 carried by the cylinders 200 are extended to move the holder 44 and cylinder 40 upwardly to position the cylinder 40 to have the middle joint 18 formed. The apparatus forms the middle joint 18 in the same way that the upper joint was formed except that the cylinders 250 are extended and the cylinder 40 is turned 180° about its longitudinal axis. After the middle joint 18 is formed, the rack and pinion drive 240 again turns the cylinder 40 180° and a cylinder 242 is extended to raise the cylinder 40 to position to have the third joint 18 formed, which is then effected in the same manner as the forming of the first joint 18 except that both cylinders 242 and 250 are extended. The completed elbow may then be removed from the apparatus and the cylinders 242 and 250 then are actuated to contract to position the apparatus in its starting position.

The width and depth of the circular cupped portion of the section 11 defined by the flanges 26 and 30 during an intermediate stage of formation of the joint 11, as illustrated in full lines in FIG. 7, and also the depth of cupped or grooved portion defined by the flanges 26 and 30, as illustrated by the broken line position of the flange 30 in FIG. 7, are substantially uniform around the entire periphery of the joint. This is made possible even though longitudinal axis 260 (FIG. 1) of rotation of the wheel housing 92 is at an angle of 15¼° relative to the longitudinal axis 68 of the cylinder 40, because the apparatus is so constructed that the axes 68 and 260 intersect in a plane 262 coincident with upper face 264 (FIG. 7) of the forming disc 88 so that the plane 262 is quite near to the point of tangency of the point of tangency of the rim 30 with the rounded peripheral edge 90. This causes the throw of the periphery 90 of the forming disc 88 to be uniform relative to the portions of the cylinder 40 being formed into the cup defined by the flange 26 and the intermediate position of the flange 30 as shown in full lines in FIG. 7 in which the flange 30 and an annular bridging portion 266 are in the form of a cylinder which is the rim of the cup. That is, the location of the intersection of the axes 68 and 260 in the plane 262 is the only location of that intersection in which the flange 26 will be of uniform width throughout its periphery, which also insures that the flange 30 is of uniform width throughout its periphery. By keeping the width of the flange 26 uniform throughout its entire periphery, the width thereof may be kept at a minimum to minimize the amount of material formed into the cupped flange and minimize the height of the resulting bead formed from the cupped flange. That is, this location of the intersection of the axes 68 and 260 makes the cupped flange (and resulting bead) concentric to the adjacent portion of the body of the cylinder 40. The point of intersection of the axes 68 and 268 may, of course, be somewhat out of the plane 262, but should not be appreciably further from the plane 262 than one-quarter of the height of the bead, which height is substantially the same as the width of the flange 26.

There is shown in FIG. 8 a control circuit of the apparatus including a control rotor 300 which can be moved manually by a handle (not shown) and also, after the start, can be and normally is stepped up by a ratcheting cylinder 302 to sequentially actuate, by a roller 304, valves 306, 308, 310 and 312. At the start, after the cylinder 40 is positioned in the gripper 42 on the holder 44 and is pushed to collapse the cylinders 242 and 250, the operator turns the control rotor 300 to a position actuating the valve 306. Oiled air under a pressure of about 64 pounds per square inch is supplied to an inlet port 314 of the valve 306 from a regulator 319 from a suitable source 321 of air under a higher, regulated pressure through lines 315. The air is then passed through the valve 306, a line 323, shuttle valve 320 and a line 322 to an entrance port 324 of valve 326. The air travels through port 328 of the valve 326, a line 330 and T-couplings 332 and 333 to lines 334, 336 and 338. The line 336 supplies the air under pressure to a shuttle valve 340 which passes the air under pressure to a valve actuator 342 of a valve 344 to move the valve 344 to a condition connecting a line 346 from the source 321 of dry air under about 100 pounds per square inch pressure to a line 348 connected to lines 350 leading to the bellows actuators 198, which then move the jaws 60 and 62 into clamping engagement with the cylinder 40.

The line 334 supplies air under pressure to a cam actuated valve 352 which at this time closes the line 334 but, when a cam 353 (FIGS. 1 and 8) movable with the gear 126 is moved slightly, the valve 352 connects the line 334 to an actuator 354 of a valve 355 to a condition connecting bellows actuators 356 to air under pressure from a line 358 from a manually operable emergency valve 360 connected to one of the lines 315. The bellows actuators 356 then move shear plates 80 into engagement with the cylinder 40 to cooperate with the shear disc 84 (FIG. 1). The cam 353 (FIG. 8) is so moved when a cylinder 160 is supplied with air under pressure caused by pressure in the line 338 operating an actuator 370 to move a valve 372 to a condition connecting a line 376 to a line 562 from a valve 522 connected to the line 315. This drives the rack 124 to the left, as viewed in FIG. 8, to turn the gear 126 and the cam 353 to change the phase of the eccentric sleeves 114 and 138 (FIG. 1) from zero throw of the shear disc 84 to full throw. This change of phase is regulated to occur gradually by a metering valve 378 connected between a reservoir 379 and the left-hand end of a hydraulic cylinder 380, as viewed in FIG. 8, containing a piston 381 having the rack 124 as its piston rod.

Prior to a piston 383 in the cylinder 160 and the rack 124 reaching their left-hand extremes of travel and just after the section 11 has been completely severed from the remainder of the cylinder 40, the cam 353 releases the valve 352 which releases the valve 355 which then connects the bellows 356 to exhaust. The bellows then retract the shear plates 80 completely. As the piston 383 in the cylinder 160 reaches the left-hand extreme of its travel, as viewed in FIG. 8, at which time the phase relationship of the eccentric sleeves 114 and 138 is such as to impart maximum throw of the shearing disc 84 and forming disc 88 (FIG. 1) and the flanges 20 and 26 (FIG. 7) have been formed, with the flange 30 forming the rim of the cup, a pin 390 (FIG. 8) on the rack 124 engages a lever 396 to actuate a valve 397 to connect the line 358 from the emergency valve 360 from low pressure line 315 to a flow control valve 400 leading to lines 402 connected to single acting cylinders 412 which move the wedges 190 to blocking positions behind the jaws 60 and 62 to prevent the jaws from fully opening. The air under pressure in the line 402 also actuates and travels through a shuttle valve 414 to actuate an actuator 416 of the valve 326. The actuator 416 reverses the valve 326 to a condition connecting the line 330 to exhaust and connects the line 322 with air under pressure to a line 420 leading to the top of the hydraulic reservoir 379. The air forces the hydraulic liquid out of the reservoir into the left-hand end of the cylinder 380 through a check valve 422 to rapidly move the rack 124 to the right back to its starting position to bring the eccentric sleeves 114 and 138 (FIG. 1) back to a zero throw relationship.

As the rack 124 returns to its starting position a pin 439 thereon engages and moves the lever 396 clockwise to actuate valve 440 to connect the line 358 from the emergency valve from the low pressure line 315 to a line 444. The line 444 leads to a pulse switch valve 452 to momentarily operate actuator 454 to shift valve 456 to a condition connecting the line 444 to a line 458, in which condition the valve 456 stays until an actuator 460 is operated. The line 458 is connected to the short cylinders 200 which are then extended to raise the holder 44 to raise the remainder of the cylinder 40 to move the flange 20 up into the cupped lower end of the severed section 11. When the cylinders 200 are extended, one of the cylinders 200 actuates a lever 462 to actuate a valve 464 to connect the line 322 to a line 463. Air under pressure in the line 463 actuates and travels through shuttle valve 474 to operate the actuator 342 to actuate the valve 344 to cause the bellows 198 to move the clamps 60 and 62 into clamping engagement with the section 11 and the remainder of the cylinder 40.

Air under pressure from the line 463 also travels through a check valve 480 and a valve 482, which has been previously actuated by an arm 484 through a line 485 to an air actuator 486, which actuates switch 488 of the motor 208 (FIG. 4) to drive the ring gear 202 clockwise. This moves the roller 210 radially inwardly and around the flange 30 (FIG. 7) to roll down the flange 30 to its broken-line position trapping the flange 20. After the roller and the ring 204 have completed somewhat more than one revolution, the ring moves the carriage 233 downwardly, as viewed in FIG. 8, and the arm 484 is moved out of engagement with the valves 482 and 522 and an arm 490 of the carriage reverses the valve 482 to connect the switch actuator 486 to exhaust and connect the line 463 to line 492. Air from the line 492 actuates stepping cylinder 302 to step the rotor 304 from valve 306 to valve 308. The line 492 supplies the air under pressure to and through shuttle valve 500 to operate switch actuator 502 to reverse the switch 488 to reverse the motor 208 to return the ring gear 202, the ring 204 and the roller 210 to their starting positions, which, when arrived at, actuates the carriage 233 to reverse the condition of the valve 482. Air under pressure in the line 492 also actuated actuator 460 to reverse valve 456 to connect the short cylinders 200 to exhaust and the cylinders 200 contract.

As the ring 204 is returned to its starting position, it returns the lost motion carriage 233 to a position in which the arm 484 actuates the valve 482 and a valve 522. The valve 482 connects the line 492 to exhaust to release the motor switch actuator 502 to stop the motor 208 and also exhausts the single acting pawl cylinder 302 (FIG. 8) to cause to retract. This also exhausts actuator 460 on valve 456.

The above-described stepping of the rotor 300 to its position in which the cam 304 has released the valve 306, which closes, actuates the valve 308 to connect the supply line 315 to line 508. Air under pressure travels from the line 315, through the valve 308, the line 508, which supplies the air under pressure, to the left-handed end of cylinder 536 to move pistod rod 538 carrying the 240 to the right, as viewed in FIG. 8. This turns the holder 44 and entire cylinder 40 180°. The air under pressure in the line 508 also actuates and goes through shuttle valve 540 to line 542, and through a flow control valve 546, line 548, shuttle valve 550 and line 552 to the parallel cylinders 250 to extend the cylinders 250 to lift the holder 44 and the cylinder 40 to position the latter for making the second joint 18.

When the rotor 300 has actuated the valve 308 as described above, air under pressure also travels from the line 542 to and through the shuttle valve 320 to the line 322 and the valve 326 to again supply air to reservoir 379, which has already actuated cylinder 380. Then, when the ring 204 and the roller 210 are returned to their starting positions, the ear 220 (FIG. 4) on the ring gear pushes the roller 210 back into recess 230 in the ring gear 202. Also, the arm 484 (FIG. 8) of the carriage 233 actuates the valve 522 to connect line 562 to a pulse valve 563, which shifts the valve 326 to a condition connecting the line 322 to the line 330. The cycle described above then is repeated and the apparatus functions to clamp and sever the cylinder 40, cup and flange the section 12 and the remainder of the cylinder, and form the middle joint 18 in the same manner as described above in forming the first joint 18. At the end of the cycle, when the arm 484 of the lost motion carriage 233 actuates the valve 482 to step the rotor 300 by the pawl cylinder 302 to a position releasing the valve 308 and actuating the valve 310, the valve 310 passes air under pressure from line 315 to line 584. The air under pressure travels through the line 584, a flow control or timing valve 590, a line 592, a shuttle valve 594, and line 596. The air under pressure in the line 596 extends the cylinders 242, the air under pressure in the line 508 actuating and passing through the shuttle valve 540 to the line 542 to keep the parallel cylinders 250 extended, the air under pressure in the line 596 reversing cylinder 536 to turn the holder 44 and the entire cylinder 40 back 180° preparatory to making the third joint 18 and the cylinders 242, of course, lifting the holder 44 and entire cylinder 40 upwardly for the third joint.

The apparatus functions to form third joint 18 in the same manner as that described above in making the first joint. When the arm 484 of the lost motion carriage 233 actuates the valve 482 to connect the line 492 to actuate the stepping cylinder 302, the rotor 300 is stepped to release the valve 310 and actuate the valve 312. The valve 312 connects the air pressure line 315 to a line 612 which passes the air under pressure to and through the shuttle valves 550 and 594 which maintain the cylinders 242 and 250 extended to hold the complete elbow elevated to permit easy removal thereof by the operator. The operator then removes the elbow from the apparatus and turns the rotor 300 to an idle position thereof in which the actuator roller 304 is out of engagement with any of the valves 306 to 312. Release of the valve 312 permits it to return to the position thereof shown in FIG. 8 in which it connects the cylinders 242 and 250 to exhaust, and these cylinders contract to lower the holder 44 to its starting position when another cylinder 40 is inserted and pushed down. Another elbow may then be formed as described above by turning the rotor 300 to its position actuating the valve 306.

The valve 360 and a valve 630 are provided for emergencies and are operable sequentially and manually by an actuator 632. Upon initial movement of the actuator, 632, the valve 360 is moved to connect the line 358 to exhaust, and the line 315 to lines 636. Air from the line 636 actuates and travels through the shuttle valve 414 and causes the actuator 416 to reverse the valve 326 to bring the throw of the shearing disc 84 and forming disc 88 (FIG. 1) to zero and to exhaust line 330 to retract the clamps 60 and 62 and shear plates 80. Upon further movement of the actuator 632, the valve 630 is actuated to connect line 315 to a line 652 to reverse the motor switch 488 through the shuttle valve 500 and actuate the valve 344 through the shuttle valve 474 to momentarily pulse the bellows 198 to permit the wedges 190 to be withdrawn from blocking positions.

EMBODIMENT OF FIGS. 12 AND 13

An elbow forming machine 700 forming an alternate embodiment of the invention serves to automatically form the multiple joint elbow 10 from a cylindrical sheet metal blank or cylinder 702 like the cylinder 40. In the machine 700, the cylinder 702 is placed on a holder 704 in a position inside upper, segmental clamps 760 and lower, split ring or clamp 708 carried by frame 710. Bellows 712 and 714 are then actuated to close the clamps 706 and close outer shear plates 716 and an air cylinder device 718 is actuated to tighten the clamp 708 on the cylinder.

A motor 720 is energized to drive a sleeve or hollow shaft 722 through its pulley, a belt 724 and a pulley 726, the sleeve being journaled in bearings 728 and 730 carried by the frame 710, the upper bearing being in an inclined, boss-like portion 723 of the frame. The sleeve 722 carries a roller 733 to form a keying ridge 735, and rotates a disc portion 754 at its upper end to revolve shafts 736, 738 and 750 journaled in the disc portion. The shaft 736 revolves gear 740 around a fixed pinion 742 carried at the upper end of a shaft 743 fixed to a torsion bar 744 fixed to the frame 710. The gear 740 is keyed to the shaft 736 and turns the shaft 736 and a gear 746 also keyed to the shaft 736. The gear 746 rotates a larger gear 748 keyed to a shaft 750 to turn a smaller gear 752 also keyed to the shaft 750, the shaft 750 being journaled in a plate 754 carried by the sleeve 722 and journaling the shafts 736 and 738. The gear 752 rotates a gear 756 journaled on the shaft 738 and the gear 756 is pinned by a screw 758 to an eccentric cam 760 which is journaled on the shaft 738.

An annular forming and shearing disc 762 journaled for free rotation on the eccentric cam 760 is revolved by the sleeve 722, and the cam 760 is turned 360° in each cycle of the operation of the motor to slowly move the disc radially outwardly from a retracted position fully inside the cylinder 702 through a shearing position, in which shearing edge 764 of the disc 760 and the shearing plates 716 sever the cylinder. The shear plates 716 then are retracted and the eccentricity of the shearing disc 762 is increased to an extreme outer, forming position, in which forming portions 766 and 768 of the disc 760 form respectively a cupped flange 770 and a radial flange 772 on the adjacent end portions of the severed sections of the cylinder 702, and then returns the disc to its retracted position. It will be appreciated that the disc 762 is revolved many times about the sleeve 722 during the single rotation of the cam 760.

After the motor 720 has rotated the cam 760 one complete revolution, it is stopped by a known counter type control (not shown) driven by the motor 720, and the control actuates solenoid actuator 718 to release the clamp 708 and also actuates a valve (not shown) to admit air under pressure into the bottom of an annular cylinder 769 to move upwardly an annular piston 771 having inner and outer O-ring seals 773 and 775. The annular piston of the holder 704 is splined by spline 765 to the cylinder 769, holds the work cylinder 702, and moves the lower section of the cylinder 702 upwardly to seat the flange 772 in the cupped flange 770. As this occurs, an actuator (not shown) on the piston 771 actuates a switch to start a motor 780 which then rotates an internally threaded ring gear 782 through a pinion 784. The ring gear 772 revolves posts 786 and moves upwardly on threaded boss 788 fixed to the frame 710. The posts revolve arms 790 carrying rollers 792 to slide followers 793 upwardly along frusto-conical cam 794 carried by hollow outer frame portion 796. The arms 790 are biased upwardly toward the cam 794 by torsion springs (not shown). The cam 794 guides the rollers 792 into engagement with the rim of the cupped flange 770, and the rollers roll or turn the rim inwardly to entrap the radial flange 772 to complete the joint. The motor 780 then is reversed by a know revolution counter type control (not shown) driven by the motor 780 to return the ring gear 782 to its lowermost or starting position. After the ring gear has partially retracted the rollers 792, a switch 800 is actuated by the ring gear 782 to release the solenoid actuator 718, actuate the bellows 712 to withdraw the upper clamps 706 and start a reversible motor 802. The motor 802 then rotates an elongated pinion 804 and a known revolution counter type control. The pinion then drives a ring gear portion 806 of the annular cylinder 769 to rotate the annular cylinder 769, the piston 771 and the work cylinder 702 180° and then is stopped by the revolution counter type control. This turns the work cylinder 702 180° about its axis. As this half revolution of the annular cylinder 769 occurs, the cylinder 769, the piston 771 and the work cylinder are raised axially by a follower pin 810 carried by the piston 771 and projecting into a helical cam slot 812 formed in the boss portion 732. This pin and slot construction raises the work cylinder 702 to the desired position for forming the second rotary joint, and when the cylinder 702 arrives at this position the counter type control of the motor 802 stops the motor 802, actuates the bellows 712 and 714 and the clamp actuator 718 and the joint forming cycle described above then is repeated to form the second joint.

After the second joint has been formed in the cylinder 702, the cylinder is again released by the clamps 706 and 708 and the motor 802 rotates the holder 704 and the cylinder 702 180° further to again raise the cylinder. After the cylinder 702 has been so raised and turned, the clamping plates 706 and the clamp 708 clamp the cylinder and a third joint is formed in the manner described above in forming the first or uppermost joint. After the third joint is formed, the clamping plates 706 and the clamp 708 are released and the completed elbow is removed. Another cylinder like the cylinder 702 then is inserted into the holder 704, the motor 802 is reversed to drive the holder 704 one revolution to lower it and the work cylinder held thereby to their lowermost or starting positions and the operation described above is repeated.

EMBODIMENT OF FIGS. 14 AND 15

An elbow forming machine 820 forming an alternate embodiment of the invention is identical to the elbow forming machine 700 except that the machine 820 does not have the rollers 792 and their actuating elements, and, instead of the clamping ring 708, has a split clamping ring 822 which serves both to clamp a work cylinder 824 and to turn down or roll a rim of a cupped flange 826 of an upper section 827 of the cylinder 824 over a radial flange 828 formed on a lower section 830 of the cylinder. The clamping ring 822 is slightly released from clamping the cylinder during the turning down of the rim and is pressed axially to effect the turning down or rolling of the rim by hydraulic piston drives 832. The ring 822 has an annular groove 834 which engages edge 836 of the rim of the cupped flange 826 and rolls the rim radially inwardly and over the radial flange 828.

In the operation of the elbow forming machine 820, the cylinder 824 is placed in a holder (not shown) like the holder 704 (FIG. 12) and upper segmental clamps 840 and the clamping ring 822 are colsed to grip the cylinder 824. The clamps 840 and the ring 822 distort the portions gripped to cylindrical form inclined to the longitudinal axis of the cylinder 824. Then outer, segmental shear plates 842 are forced against the cylinder and a shearing disc or wheel 844 is revolved rapidly and is moved gradually radially outwardly of the cylinder to shear the cylinder and form the cupped flange 826 and the radial flange 828 essentially in a plane inclined 15¼° to the axis of the cylinder 824, the shearing plates 842 being withdrawn outwardly just after the severance of the cylinder into the sections 827 and 830. Then, the split clamping ring 822 is released slightly to permit the section 830 to be moved relative thereto and the section 830 is pushed up to seat the flange 828 in the cupped flange 826. Then the hydraulic piston drives 832 force the ring 830 upwardly along the axis of the cylinder 824 to engage and roll inwardly the rim of the cupped flange 826 to complete the rotary joint. The ring 822 then is withdrawn, the cylinder is released and is rotated 180° and raised, and a second joint is formed like the first joint as just described, after which the cylinder is turned 180° and raised, and a third joint is similarly formed.

The above described elbow forming methods and machines automatically sever the work cylinders and form each of the three joints 180° apart from its adjacent joints. Each of the joints is circular (or cylindrical) even though it lies in a plane tilted 15¼° from the perpendicular to the longitudinal axis of the cylinder. In the machine of FIGS. 1 to 8, since upper face 264 of the forming rotor or disc 88 lies in a plane intersecting the axes 68 and 260 at a point 660, the point of triple cross, at which the axes 68 and 260 intersect each other, the flanges 26 and 30 (FIG. 7) each are of uniform width around its entire length or periphery, and the resulting entrapping grooved structure defined by the flanges 26 and 30 and the curved brdiging portion 266 is of uniform depth entirely therearound. These machines 700 and 820 are similarly constructed to have this point of triple cross, and the resulting advantages. Since the above described methods and machines effect the severing before any substantial portion of the forming of the flanges occurs, the flanges are formed with little or no distortion of the portions of the cylinder adjacent the flanges is effected, and the separate flanges are formed with a minimum of power and a minimum of wear on the working elements of the machines. Since each joint is formed at a single station with the work cylinder being moved axially to position it for subsequent joints, the machines are quite compact and require a minimum of power. While the above methods and machines have been described as making elbows having three 15° joints, the machines may obviously be modified to make "angles" which have single 45° joints, and the term "elbow" as used herein is intended to be generic to jointed angular sheet metal connecting pipes, each elbow having one or more rotary joints.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an elbow forming method,
holding a cylinder in a predetermined position,
severing the cylinder into first and second sections along a predetermined plane inclined to the axis of the cylinder,
continuing to hold the cylinder in said position,
forming a cupped flange on the end portion of the first section adacent the second section,
forming a radial flange on a portion of the second section adjacent the first section,
moving the sections longitudinally together to move the radial flange into the cupped flange,
and bending the rim of the cupped flange over the radial flange to form a rotary joint.

2. The elbow forming method of claim 1 including distorting to and holding the portions of the sections adjacent the adjacent end portions of the sections in cylindrical forms normal to said plane inclined to the cylinder while the flanges are formed.

3. The elbow forming method of claim 1 including:
moving the cylinder axially to move said joint out of said plane,
turning the cylinder through a predetermined angle about its longitudinal axis,
severing the cylinder in said plane to form two further sections,
forming a cupped flange on the end portion of one of the further sections adjacent to the other further section,
forming a radial flange ont he end portion of the other further section adjacent the one of the further sections,
moving the further sections longitudinally together to move the last-mentioned radial flange into the last-mentioned cupped flange,
and bending the rim of the last-mentioned cupped flange over the last-mentioned radial flange to form a second rotary joint.

4. The elbow forming method of claim 1 including gripping portions of the cylinder adjacent said predetermined plane with cylindrical clamps in planes parallel to said predetermined plane to distort the normally elliptical portions so gripped into the forms of cylinders,
and holding the portions so gripped in the forms of cylinders during severing of the cylinder and forming the flanges.

5. The elbow forming method of claim 1 including forming a peripheral rib in the cylinder to aid in holding the cylinder while the cylinder is severed and the flanges are formed.

6. The elbow forming method of claim 1 wherein the steps of severing the cylinder and forming the flanges is effected by revolving a forming and shearing disc in the cylinder to first sever the cylinder into the sections and then press adjacent end portions of the sections outwardly.

7. In an elbow forming machine,
joint forming means defining a work area,
holding means inclined relative to the work area for holding a work cylinder in the work area,
means for moving the holding means axially of a work cylinder held by the holding means to sequentially position longitudinally spaced portions of the cylinder in the work area,
means for turning the cylinder about its longitudinal axis through an angle of 180°,
and means for actuating the joint forming means to sever and form a joint in each of said longitudinally spaced portions of the cylinder while that spaced portion is positioned in the work area.

8. In an elbow forming machine,
outer clamping and forming means at a work area,
inner shearing and forming means adapted to sequentially shear a cylinder into first and second sections and coact with the outer clamping and forming means to form flanges on the sections,
means for interlocking the flanges of the sections to form a rotary joint,
and positioning means for sequentially positioning longitudinally spaced portions of the cylinder to the work area and repeatedly actuate outer clamping and forming means, the inner shearing means and the means for interlocking the flanges to repeatedly form rotary joints in said longitudinally spaced portions of the cylinder.

9. In an elbow forming machine,
annular first clamping and forming means,
annular second clamping and forming means,
frame means mounting the first and second clamping and forming means in adjacent, axially spaced, aligned positions adapted to clamp axially spaced portions of a cylinder,
and inner shearing and forming means adapted to first completely sever the portion of the cylinder between said axially spaced portions of the cylinder to form two sections and then coact with the first and second clamping and forming means to form radially outwardly extending flanges on the adjacent end portions of the sections of the cylinder.

10. The elbow forming machine of claim 9 wherein the inner shearing and forming means includes a disc having a shearing edge positioned between and spaced axially from the first and second clamping and forming means and also having a first peripheral flange forming portion at one side of the shearing edge and adapted to coact with the first clamping and forming means to form one of the flanges and a second peripheral flange forming portion adapted to coact with the second clamping and forming means.

11. The elbow forming machine of claim 10 including adjustable eccentric means for revolving the disc,
and means for adjusting the eccentric means to vary the throw of the disc.

12. The elbow forming machine of claim 10 wherein the first peripheral flange forming portion is spaced axially from the shearing edge to form a cupped flange and the second peripheral flange forming portion extends axially substantially to the shearing edge to form a radial flange.

13. The elbow forming machine of claim 12 including means for moving the sections axially toward each other to move the radial flange into the cupped flange,
and means for turning the rim of the cupped flange radially inwardly to entrap the radial flange.

14. In an elbow forming machine,
drive means rotatable on a first axis,
outer clamping and forming means centered on the first axis and having a forming face in a predetermined plane inclined to the first axis and adapted to form a cylinder when closed,
means for holding a work cylinder centered in the clamping and forming means in a position inclined to the first axis with the longitudinal axis of the work cylinder intersecting the first axis in said plane,
means for actuating the outer clamping and forming means to clamp the work cylinder and forcing the portion thereof clamped into cylindrical form on an axis inclined to the longitudinal axis of the work cylinder,
means for severing the work cylinder in a second plane spaced from said predetermined plane and parallel thereto,
and inner forming means driven by the drive means for engaging the portion of the work cylinder between said planes and forcing a portion thereof spaced from the severed end radially outwardly and against the forming face of the outer clamping and forming means to form a cupped flange.

15. The elbow forming machine of claim 14 including second outer clamping and forming means spaced axially from and aligned with the first-mentioned clamping and forming means for clamping a portion of the work cylinder and having a forming face spaced from the second plane and at the side of the second plane opposite the first plane,
and second inner forming means driven by the drive means for moving the entire end portion of the work cylinder between the forming face of the second outer clamping and forming means and the second plane against the forming face of the second outer clamping and forming means.

16. In an elbow forming machine,
a holder for holding a work cylinder in a predetermined position,
outer forming means for engaging the outer periphery of the cylinder,
a shearing and forming disc for shearing and forming the cylinder,
adjustable throw eccentric means for revolving the shearing and forming disc in the cylinder in a plane inclined to the longitudinal axis of the cylinder,
drive means for rotating the eccentric means about a predetermined axis normal to said plane,
and gear reduction means driven by the drive means for adjusting the eccentric means as the eccentric means revolves the shearing and forming disc.

17. The elbow forming machine of claim 16 wherein the eccentric means includes a pair of eccentric sleeves adjustable by the gear reduction means from an out of phase relationship to an in phase relationship.

18. The elbow forming machine of claim 16 wherein eccentric means includes a shaft means having a head and an eccentric cam mounted rotatably on the head and mounting the shearing and forming disc and driven by the gear reduction means.

19. The elbow forming machine of claim 18 wherein the shaft means is hollow and the gear reduction means includes a fixed sun gear extending through the hollow shaft, and planetary gear means carried by the head and revolved around the sun gear.

20. The elbow forming machine of claim 16 including means for forming a peripheral keying ridge in the cylinder for holding the cylinder during servering of the the cylinder.

21. In an elbow forming machine,
means for holding a work cylinder,
means for severing the work cylinder,
means for forming a cupped flange on one severed end portion of the cylinder to form two sections,
means for forming a radial flange on the other severed end portion of the cylinder,
means for moving the sections axially toward each other to seat the radial flange in the cupped flange,
and bending means for turning the rim of the cupped flange inwardly over the radial flange to entrap the radial flange in the cupped flange.

22. The elbow forming machine of claim 21 wherein the bending means includes a roller means, means for revolving the roller means around the cylinder and cam means for moving the roller inwardly of the cylinder to roll the rim of the cupped flange inwardly over the radial flange.

23. The elbow forming machine of claim 22 wherein the means for revolving the roller means around the cylinder includes an annular carrier means and a ring gear drive for rotating the annular carrier.

24. The elbow forming machine of claim 23 wherein the carrier means includes a plurality of pivotal arms,
the roller means includes a plurality of rollers carried and the cam means includes an annular frustoconical cam member, cam followers on the arms and engaging the cam member and means for moving the arms and the rollers axially of the cylinder to cause the cam member to swing the arms inwardly relative to the cylinder.

25. The elbow forming machine of claim 21 wherein the bending means includes an annular member slidable along the cylinder and having an annular groove in an end thereof for engaging the rim of the cupped flange and bending the rim radially inwardly and means for sliding the annular member along the cylinder.

References Cited

UNITED STATES PATENTS

| | | |
|---|---|---|
| 2,089,972 | 8/1937 | Lyon. |
| 2,162,722 | 6/1939 | Lyon. |
| 2,583,401 | 1/1952 | Weltmer. |
| 2,698,989 | 1/1955 | Lyon _____ 29—416 |
| 3,263,321 | 8/1966 | Lombardi. |
| 3,412,454 | 11/1968 | Cardiff _____ 29—437 |

THOMAS H. EAGER, Primary Examiner

U.S. Cl. X.R.

29—157, 208; 113—1, 116

PO-1050
(5/69)

UNITED STATES PATENT OFFICE
CERTIFICATE OF CORRECTION

Patent No. 3,490,137        Dated January 20, 1970

Inventor(s) George J. Buck and Louis E. Marantette

It is certified that error appears in the above-identified patent and that said Letters Patent are hereby corrected as shown below:

Column 4, line 60, "paws" should be -- jaws -- ;
         line 62, "paws" should be -- jaws -- .
Column 6, line 27, "up" should be deleted.
Column 7, line 33, after "valve" should be inserted -- 360 -- .
Column 8, line 14, "handed" should be -- hand -- ;
         line 16, before "240" should be inserted -- rack
         line 66, "complete" should be -- completed -- .
Column 9, line 6, the comma should be deleted at the end of the line ;
         line 27, "760" should be -- 706 -- ;
         line 37, "723" should be -- 732 -- .
Column 10, line 19, "know" should be -- known -- .
Column 11, line 8, "colsed" should be -- closed -- ;
          line 44, "brdiging" should be -- bridging -- .
Column 12, line 25, "ont he" should be -- on the -- .
Column 13, line 43, the comma (,) should be a period (.).
Column 14, line 64, after "carried" should be inserted -- by the arms, -- .
In the references, "Lyon 2,162,722" should be -- Lyon 2,162,733 -- .

SIGNED AND
SEALED

JUN 16 1970

(SEAL)
Attest:

Edward M. Fletcher, Jr.
Attesting Officer

WILLIAM E. SCHUYLER,
Commissioner of Paten